(12) United States Patent
Rekimoto

(10) Patent No.: US 8,184,053 B2
(45) Date of Patent: May 22, 2012

(54) POSITION ESTIMATING SYSTEM, RADIO COMMUNICATION APPARATUS, PROGRAM, POSITION ESTIMATING METHOD AND INFORMATION SERVER

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 126 days.

(21) Appl. No.: 12/602,928

(22) PCT Filed: Jun. 5, 2008

(86) PCT No.: PCT/JP2008/060372
§ 371 (c)(1),
(2), (4) Date: Apr. 9, 2010

(87) PCT Pub. No.: WO2008/149935
PCT Pub. Date: Dec. 11, 2008

(65) Prior Publication Data
US 2010/0201574 A1    Aug. 12, 2010

(30) Foreign Application Priority Data
Jun. 7, 2007    (JP) ................................. 2007-151454

(51) Int. Cl.
*G01S 3/02*    (2006.01)
(52) U.S. Cl. ....................................... 342/464; 342/463
(58) Field of Classification Search ................. 342/451, 342/463–465; 455/456.2, 456.5, 457
See application file for complete search history.

(56) References Cited

U.S. PATENT DOCUMENTS
6,636,249 B1    10/2003    Rekimoto

FOREIGN PATENT DOCUMENTS
JP    2006-166421    6/2006
JP    2006-171012    6/2006

*Primary Examiner* — Dao Phan
(74) *Attorney, Agent, or Firm* — Finnegan, Henderson, Farabow, Garrett & Dunner, L.L.P.

(57) ABSTRACT

A radio communication apparatus has a storage section for correlating and storing positional information and identification information of the base station, a receiving section for receiving radio signals transmitted from the base station and containing the identification information and a position estimating section for estimating position of the radio communication apparatus based on the positional information stored in the storage section. In the storage section, the positional information of a first base station within a first coverage is represented by using a first discrete value obtained by quantizing the position of the first base station by setting the first coverage as a quantization coverage and a first quantization number as a quantization number and the positional information of a second base station within a second coverage whose area is narrower than the first coverage and where the base stations are more densely installed than the first coverage is represented by using a second discrete value obtained by quantizing the position of the second base station by setting the second coverage as a quantization coverage and a second quantization number that is smaller than the first quantization number as a quantization number.

9 Claims, 8 Drawing Sheets

FIG.4

| BASE STATION ID | RECEIVING STRENGTH |
|---|---|
| 30A | −90Dbm |
| 30B | −70Dbm |
| 30C | −80Dbm |
| 30D | −75Dbm |
| ⋮ | ⋮ |

FIG.5

| BASE STATION ID | LATITUDE | LONGITUDE |
|---|---|---|
| 4f:03:02:e5:6c:a0 | 135.05455 | 36.92945 |
| F0:46:3d:96:b3:06 | 136.94060 | 35.49620 |
| ⋮ | ⋮ | ⋮ |

FIG.8A

| BASE STATION ID | a | b |
|---|---|---|
| 3a:03:12:e4:6c:a3 | 17:45 | 5c:35 |
| 82:1d:32:ae:2c:31 | a2:3d | 2d:11 |
| bb:d2:15:cc:4a:98 | 85:2a | 32:45 |
| ⋮ | ⋮ | ⋮ |

FIG.8B

| BASE STATION ID | c | d |
|---|---|---|
| 11:a3:1f:22:bc:12 | c2:37:67 | 22:5b:d4 |
| 22:13:d2:af:23:a1 | 31:a4:3d | ca:6d:14 |
| c3:42:ff:3c:a5:78 | 5f:c5:4a | 34:aa:4f |
| ⋮ | ⋮ | ⋮ |

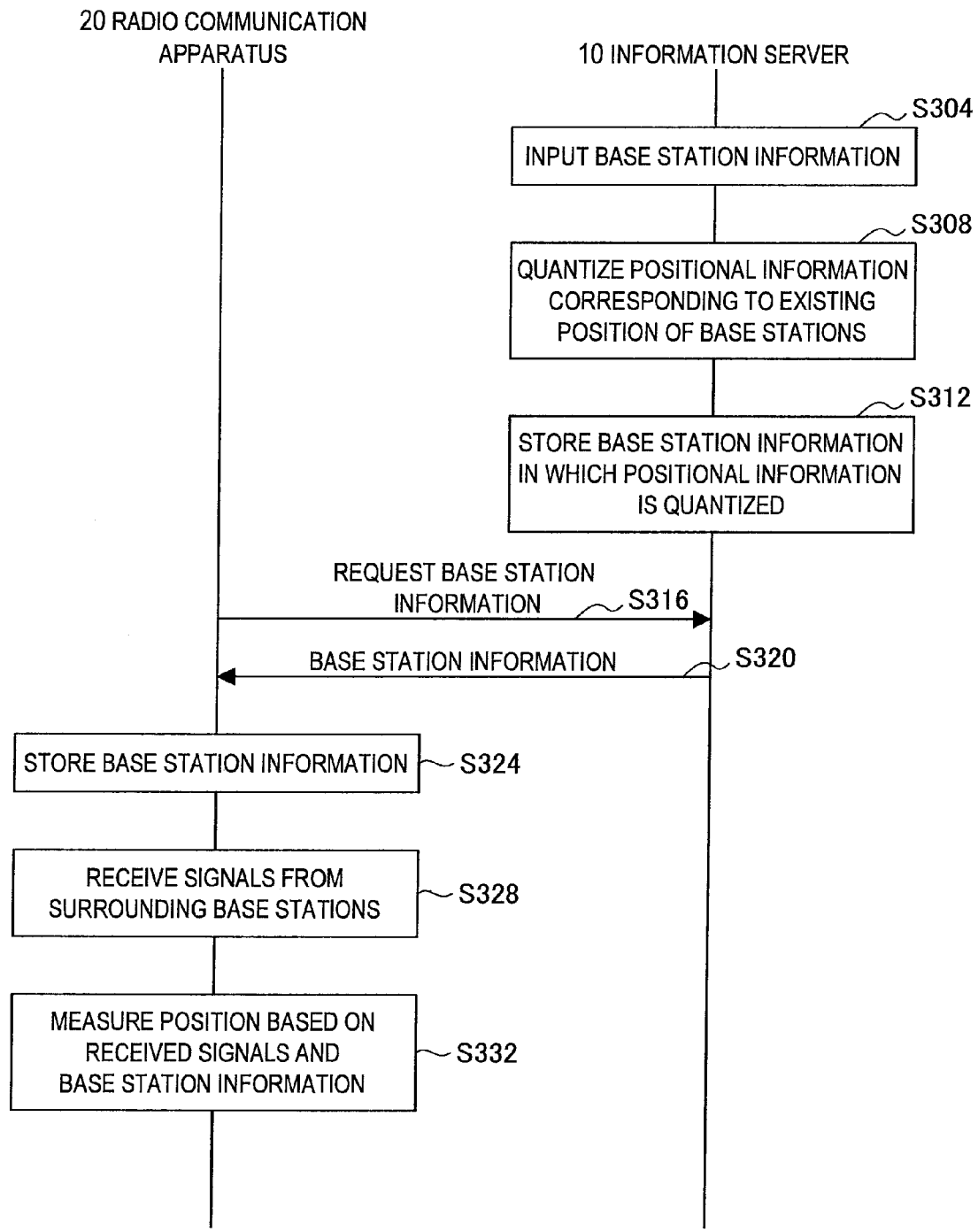

POSITION ESTIMATING SYSTEM, RADIO COMMUNICATION APPARATUS, PROGRAM, POSITION ESTIMATING METHOD AND INFORMATION SERVER

TECHNICAL FIELD

The present invention relates to a radio communication system, a radio communication apparatus, a program, a position estimating method and an information server.

BACKGROUND ART

Lately, a receiver capable of receiving radio signals transmitted from satellites has come to be mounted in mobiles such as cars and portable phones. It has then become possible to estimate position of the mobile carrying such receiver by positioning by means of GPS (Global Positioning System). The technology for estimating position by using such receiver is a common basic technology essential in a variety of fields such as navigation, security, entertainment and others. However, the position estimating technology based on positioning by means of the GPS has had problems that it takes a long time for synchronization acquisition in starting the positioning and that it is difficult to be used within a house or basement where the radio signals from the satellites do not reach.

The Patent Document 1 has disclosed a technology that enables PHS (Personal Handyphone System) to measure strength of signals transmitted from base stations to estimate its own position based on the strength of the measured signals. Specifically, communication providers place the base stations of the PHS, so that positions where they have been installed are normally known. Therefore, the PHS can estimate its own position by the principle of triangulation based on the positions of the respective base stations by measuring the strength of the signals transmitted from three or more base stations and by estimating distances between the respective base stations and its own position based on the strength of the measured signals.

It is also conceivable to provide a position estimating method that enables a radio communication apparatus that communicates wirelessly with base stations (access points) of a wireless LAN (Local Area Network) to measure strength of signals transmitted from the base stations to estimate the position of the radio communication apparatus based on the signal strength. For instance, the base station of the wireless LAN transmits beacons for announcing its existence to its surroundings at certain frequency (e.g., 5 times/sec.). The radio communication apparatus can estimate its own position based on the signal strength of the beacon and position of the base station of the wireless LAN stored in advance. This position estimating method enables the estimation of position even within a house or basement that has been difficult by the position estimating technology based on positioning by GPS because the base station of the wireless LAN may be installed within the house and basement. That is, the position estimating method described above may be a very convenient and simple position estimating technology, provided that the radio communication apparatus is arranged to store base station information indicating positions of the base stations of the wireless LAN installed around the radio communication apparatus.

PRIOR ART DOCUMENT

[Patent Document 1] Japanese Unexamined Patent Application Publication No. 2006-171012

DISCLOSURE OF THE INVENTION

[Problems to be Solved by the Invention]

However, the conventional position estimating method has had a problem that a memory capacity required for the radio communication apparatus increases because in accordance with the increase of the number of base stations of wireless LAN, the data amount of the base station information increases.

Accordingly, the present invention has been made in view of the above problems, and the present invention aims to provide a novel and improved position estimating system, radio communication apparatus, program, position estimating method, and information server, capable of suppressing the memory capacity required for the radio communication apparatus.

[Means for Solving the Problems]

In order to solve the above problems, according to an aspect of the present invention, there is provided a position estimating system including a radio communication apparatus capable of wirelessly communicating with one or more base stations, and an information server capable of communicating with the radio communication apparatus. The information server includes a quantizing section for representing positional information of a first base station located in a first coverage by using a first discrete value obtained by quantizing the position of the first base station by setting the first coverage as a quantization coverage and a first quantization number as a quantization number and for representing positional information of a second base station located in a second coverage whose area is narrower than the first coverage and where the base stations are more densely installed than the first coverage by using a second discrete value obtained by quantizing the position of the second base station by setting the second coverage as a quantization coverage and a second quantization number that is smaller than the first quantization number as a quantization number, and a first storage section for storing base station information in which the positional information represented by using the first discrete value or the second discrete value by the quantizing section is correlated with identification information of the base station. The radio communication apparatus includes an obtaining section for obtaining the base station information that is transmitted from the transmitted section and stored in the first storage section, a second storage section for storing the base station information obtained by the obtaining section, a receiving section for receiving radio signals containing the identification information of the base station transmitted from the base station, and a position estimating section for extracting the positional information of the base station indicated by the identification information contained in the radio signals from the positional information stored in the storage section and estimating the position of the radio communication apparatus based on the extracted positional information.

Furthermore, in order to solve the above problems, according to another aspect of the present invention, there is provided a radio communication apparatus capable of wirelessly communicating with one or more base stations, including a storage section for correlating and storing positional information and identification information of the base station, a receiving section for receiving radio signals transmitted from the base station and containing the identification information of the base station, and a position estimating section for extracting the positional information of the base station indicated by the identification information contained in the radio signals from the positional information stored in the storage section and estimating the position of the radio communication apparatus based on the extracted positional information. In the storage section, the positional information of a first base station located in a first coverage is represented by using a first discrete value obtained by quantizing the position of the first base station by setting the first coverage as a quantization coverage and a first quantization number as a quantization number and the positional information of a second base station located in a second coverage whose area is narrower than the first coverage and where the base stations are more densely installed than the first coverage is represented by using a second discrete value obtained by quantizing the position of the second base station by setting the second coverage as a quantization coverage and a second quantization number that is smaller than the first quantization number as a quantization number.

Such configuration allows an information amount required for representing the second discrete value to be suppressed more than an information amount required for representing the first discrete value because the second quantization number is smaller than the first quantization number. Here, the density of the base stations located in the second coverage is higher than that of the base stations located in the first coverage. Therefore, the radio communication apparatus may hold the positional information of the base stations located in the first coverage and the second coverage while suppressing the information amount as compared to a case of simply quantizing the first coverage and the second coverage altogether.

Moreover, the first quantization number or the second quantization number may be a value that keeps a quantization error of the first discrete value or the second discrete value within a range of 0.5 m to 4 m. Here, there may be a case where the accurate position of the base station is unclear even if precision of the first discrete value or the second discrete value representing the positional information of the base station is high and does not contribute for more accurate position estimation of the radio communication apparatus. Then, the information amount for representing the first discrete value or the second discrete value may be suppressed while keeping the precision of the estimation of position of the radio communication apparatus by setting the precision of the first discrete value or the second discrete value within the range of 0.5 m to 4 m.

The first coverage may be a coverage excluding the second coverage from a predetermined coverage overlapping with the second coverage. In such configuration, the second coverage does not overlap with the first coverage. Accordingly, it is possible to prevent plural positional information of the same base station from being stored in the storage section.

Moreover, a plurality of second coverages may be contained in the predetermined coverage. For instance, because the density of base stations is considered to be relatively high in urban areas, second coverages such as Tokyo, Osaka, New York and the like may be contained in a predetermined coverage when the whole world is set to be the predetermined coverage.

Moreover, the quantization error of the second discrete value may be larger than the quantization error of the first discrete value. Here, the radio communication apparatus may estimate position at higher precision when it receives radio signals from more base stations. Moreover, the density of base stations located in the second coverage is higher than that of base stations located in the first coverage with respect to this radio communication apparatus. Therefore, there may be a case where the quantization error of the second discrete value may be larger than the quantization error of the first discrete value as described above in order to realize the position estimation in the second coverage and the position estimation in the first coverage made by the radio communication apparatus at the same degree of precision. As a result, the information amount for representing the second discrete value may be suppressed while keeping the precision of position estimation by the radio communication apparatus.

Moreover, in order to solve the above problems, according to another aspect of the present invention, there is provided a program for operating a computer as a radio communication apparatus capable of wirelessly communicating with one or more base stations and includes a receiving section for receiving radio signals transmitted from the base station and containing identification information of the base station and a position estimating section for extracting the positional information of the base station indicated by the identification information contained in the radio signals from a storage medium correlating and storing the positional information and the identification information of the base station to estimate the position of the radio communication apparatus based on the extracted positional information. In the storage medium, the positional information of a first base station located in a first coverage is represented by using a first discrete value obtained by quantizing the position of the first base station by setting the first coverage as a quantization coverage and a first quantization number as a quantization number, and the positional information of a second base station located in a second coverage whose area is narrower than the first coverage and where the base stations are more densely installed than the first coverage is represented by using a second discrete value obtained by quantizing the position of the second base station by setting the second coverage as a quantization coverage and a second quantization number that is smaller than the first quantization number as a quantization number.

Such program can allow hardware resources of the computer including, for example, a CPU, a ROM or a RAM to execute the functions of the receiving section and the position estimating section as described above. That is, the computer using the program may function as the radio communication apparatus described above.

Moreover, in order to solve the above problems, according to another embodiment of the present invention, there is provided a position estimating method executed in a radio communication apparatus capable of wirelessly communicating with one or more base stations and includes the steps of receiving radio signals transmitted from the base station and containing identification information of the base station and extracting the positional information of the base station indicated by the identification information contained in the radio signals from a storage medium correlating and storing the positional information of the base station and the identification information, and estimating the position of the radio communication apparatus based on the extracted positional information. In the storage medium, the positional information of a first base station located in a first coverage is represented by using a first discrete value obtained by quantizing the position of the first base station by setting the first coverage as a quantization coverage and a first quantization number as a quantization number, and the positional information of a second base station located in a second coverage whose area is narrower than the first coverage and where the base stations are more densely installed than the first coverage is represented by using a second discrete value obtained by quantizing the position of the second base station by setting the second coverage as a quantization coverage and a second quantization number that is smaller than the first quantization number as a quantization number.

Moreover, in order to solve the above problems, according to another embodiment of the present invention, there is provided an information server capable of communicating with a radio communication apparatus capable of wirelessly communicating with one or more base stations. The information server includes a quantizing section for representing positional information of a first base station located in a first coverage by using a first discrete value obtained by quantizing the position of the first base station by setting the first coverage as a quantization coverage and a first quantization number as a quantization number, and for representing positional information of a second base station located in a second coverage whose area is narrower than the first coverage and where the base stations are more densely installed than the first coverage by using a second discrete value obtained by quantizing the position of the second base station by setting the second coverage as a quantization coverage and a second quantization number that is smaller than the first quantization number as a quantization number, a storage section for storing base station information in which the positional information represented by using the first discrete value or the second discrete value by the quantization section are correlated; and a communication section for transmitting the base station information stored in the storage section to the radio communication apparatus.

Such configuration allows the information amount required for representing the second discrete value to be suppressed more than the information amount required for representing the first discrete value because the second quantization number is smaller than the first quantization number. Here, the density of the base stations located in the second coverage is higher than that of the base stations located in the first coverage. Therefore, the information server may transmit the base station information of the base stations located in the first coverage and the second coverage whose information amount is suppressed to the radio communication apparatus as compared to the case of simply quantizing the first coverage and the second coverage altogether. As a result, it becomes possible to reduce an amount of communication with the radio communication apparatus and a memory capacity required for the radio communication apparatus.

[Effect of the Invention]

As described above, a position estimating system, a radio communication apparatus, a program, a position estimating method, and an information server according to the present invention can suppress the memory capacity required for the radio communication apparatus.

BRIEF DESCRIPTION OF THE DRAWINGS

FIG. 4 is an explanatory diagram showing one example of signal strengths measured by a measuring section;

FIG. 5 is an explanatory diagram showing a reference example of a form of base station information;

FIG. 8A is an explanatory diagram showing one example of base station information of base stations located in the base station crowded coverage recorded in a storage section;

FIG. 8B is an explanatory diagram showing one example of base station information of base stations located in the normal coverage recorded in the storage section;

FIG. 9 is a sequence diagram showing a flow of a position estimating method executed in the radio communication apparatus and the information server.

BEST MODE FOR CARRYING OUT THE INVENTION

Figure 1:
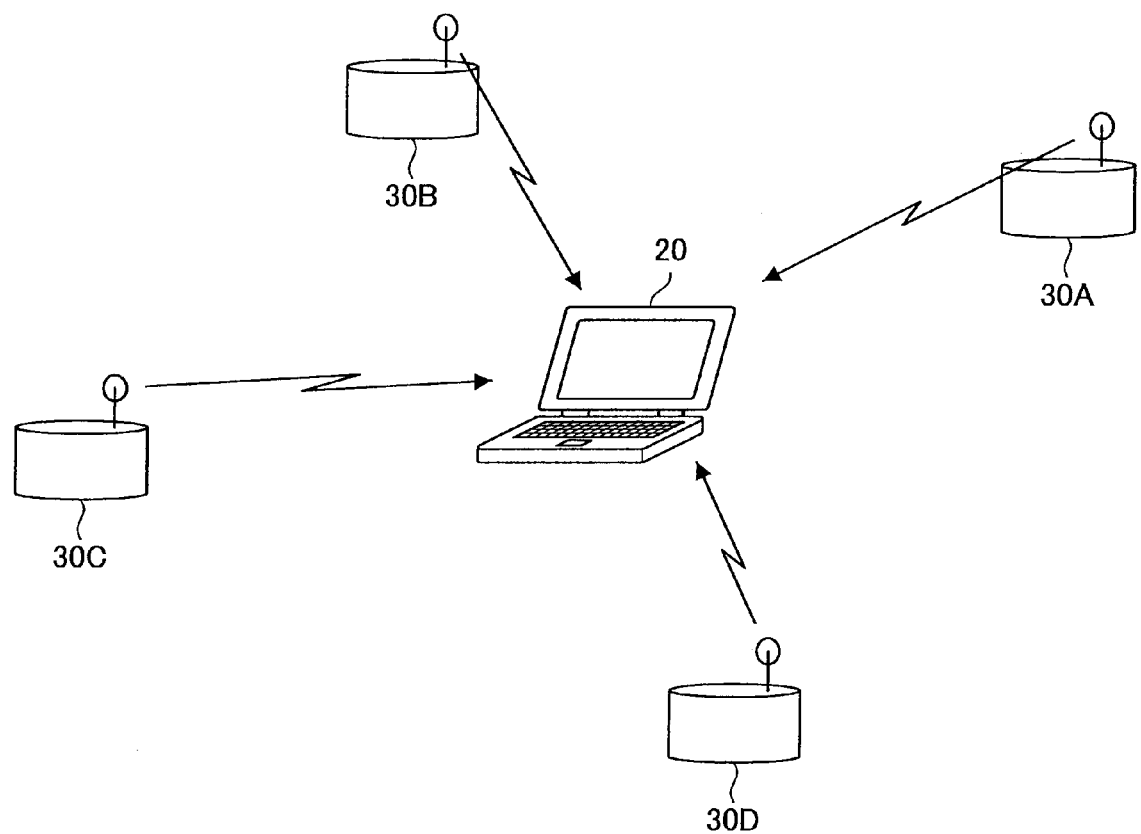
FIG. 1 is an explanatory diagram showing a configuration example of a radio communication system according to the present embodiment.

Hereinafter, preferred embodiments of the present invention will be described in detail with reference to the appended drawings. In addition, in this specification and the appended drawings, structural elements that have substantially the same function and configuration are denoted with the same reference numerals, and repeated explanation of these structural elements is omitted.

"The best mode for carrying out the invention" will be explained according to the following order.

[1] Outline of Radio Communication System according to Present Embodiment

[2] Explanation of Position Estimating System according to Present Embodiment

[2-1] Hardware Configuration of Radio Communication Apparatus

[2-2] Functional Configuration of Radio Communication Apparatus and Information Server

[2-3] Operations of Radio Communication Apparatus and Information Server

[3] Conclusion

[1] Outline of Radio Communication System According to Present Embodiment

First, an outline of a radio communication system 1 according to the present embodiment will be explained with reference to FIG. 1.

FIG. 1 is an explanatory diagram showing a configuration example of a radio communication system 1 according to the present embodiment. As shown in FIG. 1, the radio communication system 1 includes a radio communication apparatus 20 and a plurality of base stations 30A through 30D. In addition, the base stations 30A through 30D will be referred simply as the base stations 30 unless specifically required to distinguish the base stations 30A through 30D.

The base stations 30 are base stations (access points) of a wireless LAN (Local Area Network) of IEEE 802.11 series (e.g., 802.11b, 802.11g and the like) based on WiFi (Wireless Fidelity) Standard, for example.

Such base station 30 can periodically transmit beacon signals for announcing its existence to its surroundings besides signals transmitted in relaying radio communications. The beacon signal contains a base station ID as identification information uniquely given to the base station 30, for example.

The radio communication apparatus 20 correlates and stores positional information indicating positions of respective base stations 30 and the base station IDs of the base stations 30 as the base station information. Accordingly, on receiving the beacon signals from the surrounding base stations 30, the radio communication apparatus 20 may extract the positional information of the base station indicated by the base station ID contained in the beacon signal from the stored base station information and may estimate its own position based on the extracted positional information.

A concrete example of the position estimating method by means of the radio communication apparatus 20 will be described later with reference to FIG. 4. Forms of the base station information stored in the radio communication apparatus 20 will be also described later with reference to FIGS. 6 through 8.

In addition, although FIG. 1 shows a note-type PC as one example of the radio communication apparatus 20, the radio communication apparatus 20 may be an information processor or a portable device such as a PC (Personal Computer), a domestic image processor (such as DVD recorder and video deck), a portable telephone, a PHS (Personal Handyphone System), a portable music player, a portable video player, a PDA (Personal Digital Assistant), a domestic game machine, a portable game machine and appliances.

[2] Explanation of Position Estimating System According to Present Embodiment

Next, a position estimating system according to the present embodiment will be explained. The position estimating system includes the radio communication apparatus 20 and an information server 10 that transmits base station information to the radio communication apparatus 20.

In the explanation of the position estimating system, functional configurations and operations of the radio communication apparatus and the information server will be explained after explaining a hardware configuration of the radio communication apparatus 20.

[2-1] Hardware Configuration of Radio Communication Apparatus

Figure 2:
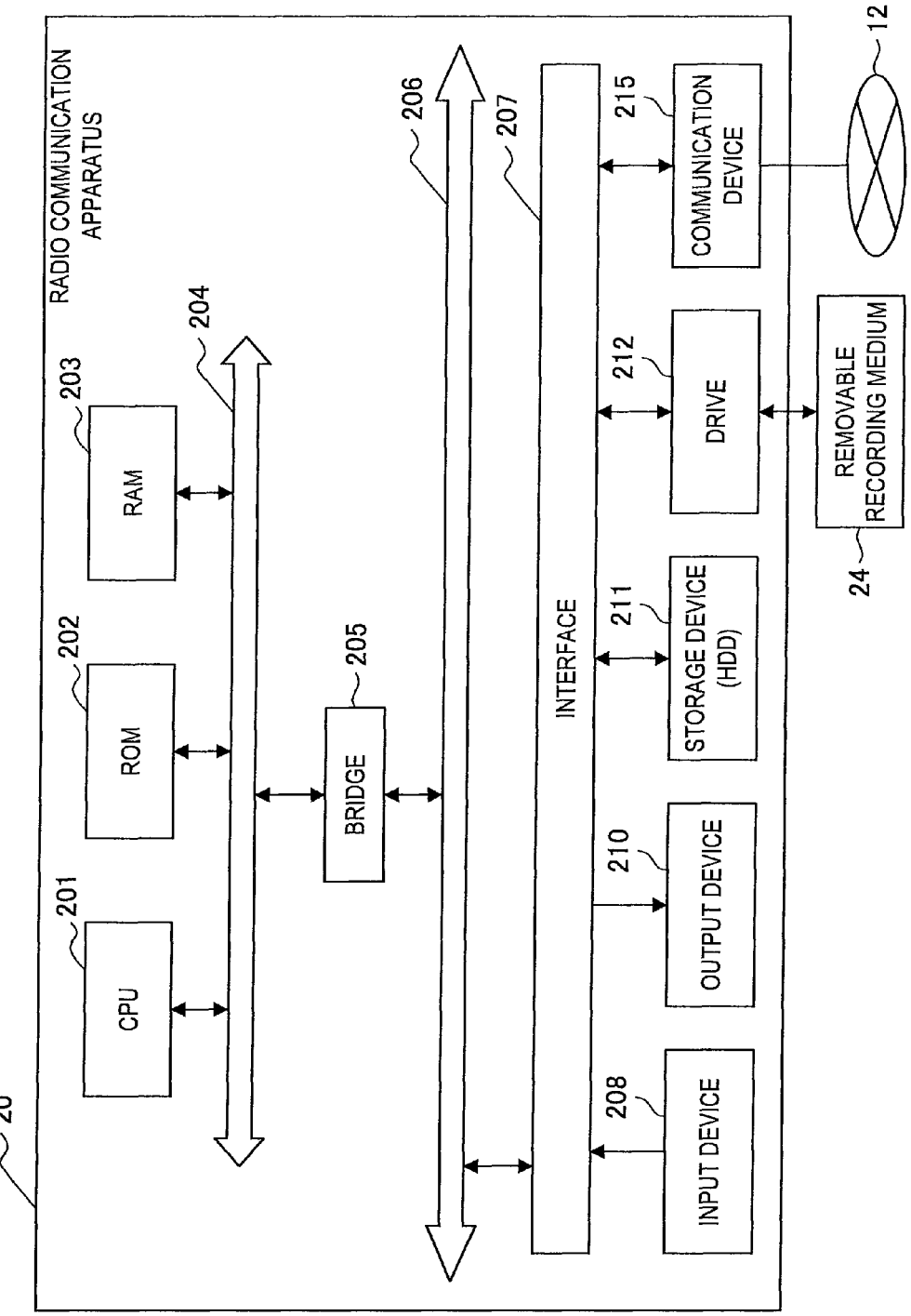
FIG. 2 is a block diagram showing a hardware configuration of a radio communication apparatus according to the embodiment.

FIG. 2 is a block diagram showing a hardware configuration of the radio communication apparatus 20 according to the present embodiment. The radio communication apparatus 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212 and a communication device 215.

The CPU 201 functions as an arithmetic processing unit and a controlling unit and controls overall operations within the radio communication apparatus 20 in accordance with various programs. The CPU 201 may be a microprocessor as well. The ROM 202 stores programs, computation parameters and the like used by the CPU 201. The RAM 203 primarily stores programs used when the CPU 201 executes, parameters that occasionally change in the execution thereof, and the like. These are mutually connected by the host bus 204 formed by a CPU bus and others.

The host bus 204 is connected to the external bus 206 such as a PCI (Peripheral Component Interconnect/Interface) bus via the bridge 205. In addition, it is not always necessary to separately construct the host bus 204, the bridge 205 and the external bus 206 and their functions may be mounted in one bus.

The input device 208 is composed of input means for enabling a user to input information such as a mouse, a keyboard, a touch panel, buttons, a microphone, a switch and a lever and an input control circuit for generating input signals based on the input by the user and for outputting them to the CPU 201. The user of the radio communication apparatus 20 may input various data and instruct processing operations to the radio communication apparatus 20 by manipulating the input device 208.

The output device 210 is composed of a display unit such as a CRT (Cathode Ray Tube) display and a LCD (liquid crystal display) and a lamp, and a sound output device such as a speaker and a headphone. The output device 210 outputs reproduced contents, for example. Specifically, the display unit displays various information such as reproduced image data by texts or images. Meanwhile, the sound output device converts reproduced sound data and others into sounds to output.

The storage device 211 is a device for storing data configured as one example of a storage section of the radio communication apparatus 20 according to the present embodiment and may include a storage medium, a recording device for recording data in the storage medium, a reading device for reading data out of the storage medium, a deleting device for deleting data recorded in the storage medium, and others. The storage device 211 may be composed of a HDD (Hard Disk Drive), for example. The storage device 211 drives a hard disk and stores programs to be executed by the CPU 201 and various data. Base station information described later is also recorded in the storage device 211.

The drive 212 is a reader-writer for the storage medium and is built in or is externally attached to the radio communication apparatus 20. The drive 212 reads out information recorded in a removable storage medium 24 such as a magnetic disk, an optical disk, an optic-magnetic disk and a semiconductor memory that is mounted thereon and outputs the information to the RAM 203.

The communication device 215 is a communication interface composed of a communication device and others for being connected to a communication network 12, for example. Moreover, the communication device 215 may be a communication unit compatible with wireless LAN (Local Area Network) or with wireless USB or a wired communication unit that communicates through wires. The communication network 12 may include wire cables such as copper lines and optical fibers, transmission paths of data such as radio waves, and data relay device such as routers and base stations 30 for controlling communications. That is, the communication device 215 transmits and receives the beacon signals and various data with the base stations 30. In addition, the various data may be arbitrary data such as music data such as music, lectures and radio programs, image data such as movies, TV programs, video programs, pictures, documents, drawings and charts as well as games and software.

In addition, a hardware configuration of the information server 10 may be arranged substantially in the same manner as the hardware configuration of the radio communication apparatus 20, so that its explanation is omitted.

Figure 3:
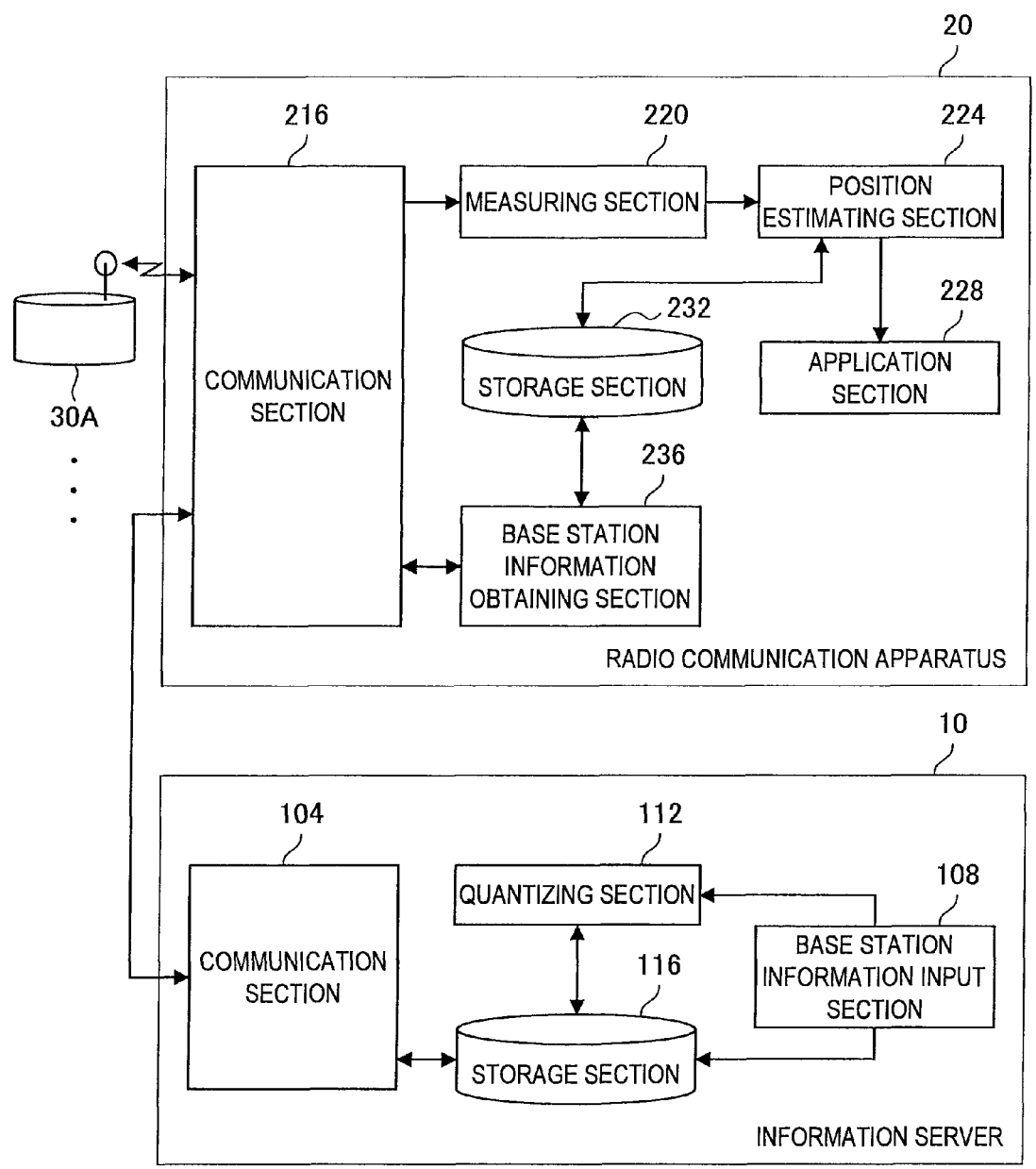
FIG. 3 is a functional block diagram showing configurations of the radio communication apparatus and an information server included in a position estimating system according to the embodiment.

[2-2] Functional Configuration of Radio Communication Apparatus and Information Server FIG. 3 is a functional block diagram showing configurations of the radio communication apparatus 20 and the information server 10 included in the position estimating system according to the present embodiment. As shown in FIG. 3, the information server 10 includes a communication section 104, a base station information input section 108, a quantizing section 112 and a storage section 116. The radio communication apparatus 20 includes a communication section 216, a measuring section 220, a position estimating section 224, an application section 228, a storage section 232 and a base station information obtaining section 236.

The communication section 216 is an interface between the radio communication apparatus 20 and the base station 30 and has functions as receiving and transmitting sections. For instance, the communication section 216 may receive signals transmitted from the base station 30. The communication section 216 also has a function as an interface between the radio communication apparatus 20 and the information server 10. For instance, the communication section 216 may transmit a request for obtaining base station information to the information server 10 and may receive the base station information from the information server 10.

The measuring section 220 measures receiving strengths of the signals transmitted from the respective base stations 30 and received by the communication section 216. FIG. 4 shows one example of signal strengths measured by the measuring section 220 when the radio communication apparatus 20 has a positional relationship with the respective base stations 30 as shown in FIG. 1.

FIG. 4 is an explanatory diagram showing one example of signal strengths measured by the measuring section 220. In FIG. 4, reference numerals and characters denoting the respective base stations 30 are supposed to indicate the base station IDs of the respective base stations 30 for convenience of explanation. Specifically, FIG. 4 shows a case where the receiving strength of the signals transmitted from the base station 30A whose base station ID is "30A" is "−90 Dbm", the receiving strength of the signals transmitted from the base station 30B whose base station ID is "30B" is "−70 Dbm", the receiving strength of the signals transmitted from the base station 30C whose base station ID is "30C" is "−80 Dbm" and the receiving strength of the signals transmitted from the base station 30D whose base station ID is "30D" is "−75 Dbm".

Meanwhile, the storage section 232 (second storage section) correlates and stores base station IDs of the base stations 30 wirelessly communicating with the radio communication apparatus 20 and positional information indicating the installation sites of the respective base stations 30 as the base station information. A concrete example of the base station information stored in the storage section 232 will be described later with reference to FIG. 8. In addition, the storage section 232 may be a storage medium such as a non-volatile memory such as an EEPROM (Electrically Erasable Programmable Read-Only Memory) and an EPROM (Erasable Programmable Read Only Memory), a magnetic disk such as a hard disk and a disk type magnetic medium, an optical disk such as a CD-R (Compact Disk Recordable)/RW (ReWritable), a DVD-R (Digital Versatile Disk Recordable)/RW/+R/+RW/RAM (Random Access Memory) and a BD (Blu-Ray Disc (trade mark))-R/BD-RE, and a MO (Magneto Optical) disk.

The position estimating section 224 estimates the position of the radio communication apparatus 20 based on the signal strength measured by the measuring section 220 and the base station information stored in the storage section 232. For instance, the position estimating section 224 estimates the position of the radio communication apparatus 20 based on the following Equation 1:

$$O = \frac{1}{W} \cdot \sum_i (Wi \cdot Ai) \quad \text{Eq. 1}$$

$$Wi = \frac{1}{distS(O, Ai)} \quad \text{Eq. 2}$$

$$W = \sum_i Wi \quad \text{Eq. 3}$$

In Equation 1, Ai indicates positional information of i-th base station 30 registered in the storage section 232. Accordingly, when the positional information of the base station 30 is expressed by longitude and latitude, Equation 1 is applied to longitude and latitude, respectively. Wi is a weighting factor obtained based on distS (O, Ai) indicating a distance between the radio communication apparatus 20 and the i-th base station 30 estimated from the signal strength as expressed by Equation 2. W is a total sum of the weighting factors as expressed by Equation 3.

When reference is made to Equation 1, positional information of the base station 30 whose distS (O, Ai) is small is largely reflected to the estimated position O of the radio communication apparatus 20 at each measuring time. Meanwhile, positional information of the base station 30 whose distS (O, Ai) is large is less influential to the estimated position O of the radio communication apparatus 20.

The position estimating section 224 can rationally estimate the positional information of the radio communication apparatus 20 by using such Equation 1. That is, the position estimating section 224 can extract the positional information (Ai) with which the base station ID of the base station 30 contained in the signals received by the communication section 216 is correlated in the storage section 232, and can estimate the position of the radio communication apparatus 20 based on the extracted positional information and the signal strength measured by the measuring section 220. The position estimating section 224 can also obtain an address such as "5th St., C Ward, AB Prefecture" based on the estimated positional information.

In addition, in the present embodiment, since quantized positional information is stored in the storage section 232, the position estimating section 224 also has a function as a decoding section for converting the quantized positional information into longitude and latitude.

In addition, the position estimating method of the radio communication apparatus 20 is not limited to the method of using Equation 1 described above, and for instance, position of the base station 30 that is the source of signals whose receiving strength is the highest in the radio communication apparatus 20 may be estimated as the position of the radio communication apparatus 20. Moreover, a center position of the base stations 30 that is the source of signals whose receiving strength exceeds a threshold value in the radio communication apparatus 20 may be estimated as the position of the radio communication apparatus 20.

Furthermore, a center position of the base station 30 that is the source of signals whose receiving strength in the radio communication apparatus 20 falls within a predetermined rate such as top 10%, 20% and the like may be estimated as the position of the radio communication apparatus 20. Furthermore, a center position of the base stations 30 that is the source of signals whose receiving strength in the radio communication apparatus 20 falls within a predetermined order such as top five, ten and the like may be estimated as the position of the radio communication apparatus 20.

The application section 228 performs processing using the position estimated by the position estimating section 224. For instance, the application section 228 may output (display) the position estimated by the position estimating section 224 from the output device 210. Moreover, the application section 228 may obtain points corresponding to the position estimated by the position estimating section 224. Furthermore, the application section 228 may request the user of the radio communication apparatus 20 for authentication processing when the position estimated by the position estimating section 224 is out of a preset coverage.

The position estimating section 224 can estimate the position of the radio communication apparatus 20 by using the base station information stored in the storage section 232 as described above. Such base station information is represented in a form shown in FIG. 5, for example.

FIG. 5 is an explanatory diagram showing a reference example of the form of the base station information. As shown in FIG. 5, when the base station ID is represented by 6 bytes and the longitude and latitude are represented by 8 bytes by using double floating points, for example, the amount of information of one base station information is 24 bytes. Accordingly, a storage medium for storing information of one million base stations requires a memory capacity of about 24 Mbytes excluding information such as an index for efficiently retrieving the information. However, because a memory capacity of the storage section 232 of the radio communication apparatus 20 is limited especially when the radio communication apparatus 20 is a portable device, it has been difficult to fully store the base station information each of which is represented by 24 bytes in the storage section 232.

Then, focusing on the circumstances described above, the inventors have come to create the radio communication apparatus 20 and the information server 10 according to the present embodiment. The information server 10 according to the present embodiment is capable of representing the positional information of the base station information while suppressing the information amount and the radio communication apparatus 20 is capable of storing the base station information whose information amount is suppressed. A configuration of the information server 10 capable of suppressing the information amount of the positional information of the base station information will be explained below.

The communication section 104 of the information server 10 is an interface with the radio communication apparatus 20 and has a function as a transmitting section for transmitting the base station information stored in the storage section 116 to the radio communication apparatus 20. The communication section 104 may also transmit the base station information periodically or in response to a request from the radio communication apparatus 20.

The base station information is input to the base station information input section 108. The base station information input section 108 may receive the base station information manually input or from an external device, for example.

The quantizing section 112 quantizes the positional information of the base station information input to the base station information input section 108 or the positional information of the base station information stored in the storage section 116. The quantizing section 112 also has a function as a recording section for recording the quantized base station information in the storage section 116.

Figure 7:
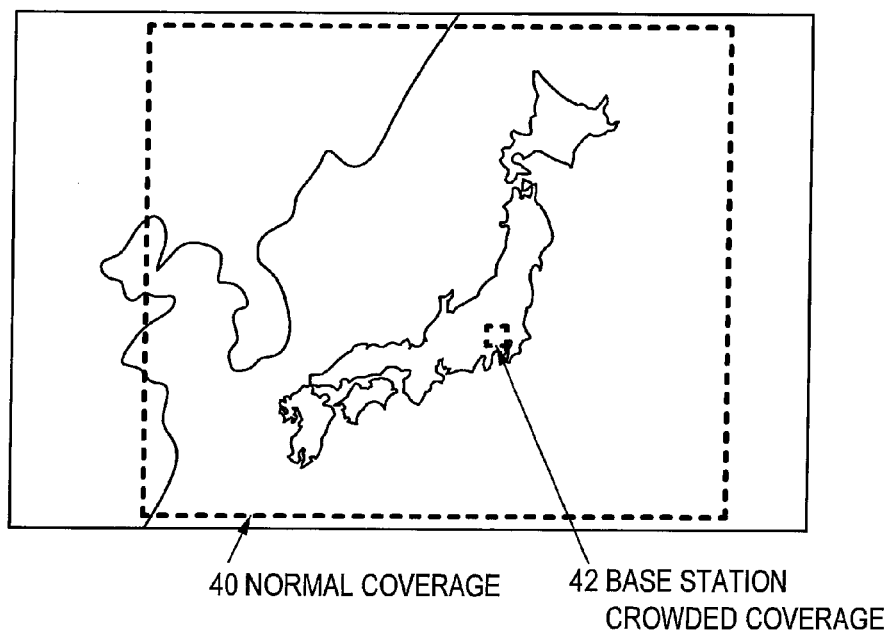
FIG. 7 is an explanatory diagram showing an example of a normal coverage and a base station crowded coverage.

The quantizing section 112 according to the present embodiment can quantize, within a predetermined coverage, base station information of base stations located in a normal coverage (first coverage) and a base station crowded coverage (second coverage) where density of the base stations 30 is higher than that of the normal coverage and whose area is smaller than that of the normal coverage, by different conditions (quantization coverages and quantization numbers). FIG. 7 shows a concrete example of the normal coverage and the base station crowded coverage.

FIG. 7 is an explanatory diagram showing the example of the normal coverage and the base station crowded coverage. In the example shown in FIG. 7, the base station crowded coverage 42 is the Kanto area where the base stations 30 are crowded and the normal coverage 40 is a coverage excluding the base station crowded coverage 42 within the predetermined coverage including Japan. In addition, selection of the base station crowded coverage 42 and the normal coverage 40 may be made manually or automatically based on the distribution of the base stations.

The quantizing section 112 represents the positional information of the base station located in the normal coverage 40 by using bit values (first discrete value) obtained by quantizing the position of the base station by setting the normal coverage 40 as a quantization coverage and a first quantization number as a quantization number. Meanwhile, the quantizing section 112 represents the positional information of the base station located in the base station crowded coverage 42 by using bit values (second discrete value) obtained by quantizing the position of the base station by setting the base station crowded coverage 42 as a quantization coverage and a second quantization number that is smaller than the first quantization number as a quantization number.

Here, the quantization includes meaning of representing continuous amount (e.g., positional information such as longitude and latitude) by discontinuous bit values. The quantization number is a value indicating that the continuous amount within the quantization coverage should be represented by how many bits (how many steps of discrete values). Accordingly, the smaller the quantization number, the more the information amount (bit numbers) for representing the positional information is suppressed.

Because the quantizing section 112 described above represents the positional information of the base station located in the base station crowded coverage 42 by using the bit values obtained by quantizing the position of the base station by setting the base station crowded coverage 42 as the quantization coverage and the second quantization number that is smaller than the first quantization number as the quantization number, it is possible to suppress the information amount for representing the positional information of the base stations within the base station crowded coverage 42. A concrete example of quantization performed by the quantizing section 112 will be explained with reference to FIG. 6.

Figure 6:
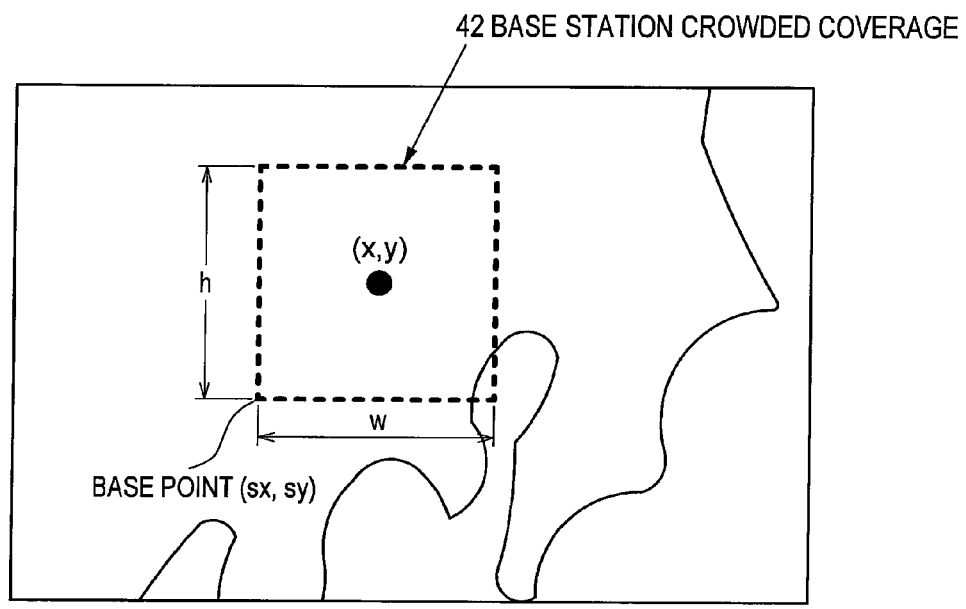
FIG. 6 is an explanatory diagram showing a concrete example of quantization performed by a quantizing section.

FIG. 6 is an explanatory diagram showing the concrete example of quantization performed by the quantizing section 112. As shown in FIG. 6, the base station crowded coverage 42 is a rectangular area having longitudinal distance w and latitudinal distance h, starting from (sx, sy). Here, a number for longitudinally dividing the base station crowded coverage 42, i.e., a longitudinal quantization number of the base station crowded coverage 42, is denoted by $\alpha$, and a number for latitudinally dividing the base station crowded coverage 42, i.e., a latitudinal quantization number, by $\beta$. When the longitudinal quantization number of the base station crowded coverage 42 is denoted by $\alpha$ and the latitudinal quantization number as $\beta$ as described above, the second quantization number is a value obtained by multiplying $\alpha$ and $\beta$.

When the bit number obtained by longitudinally quantizing the base station crowded coverage 42 is denoted by a bit value a and the bit number obtained by latitudinally quantizing the base station crowded coverage 42 is denoted by a bit value b, the longitude x and latitude y contained in the base station crowded coverage 42 may be expressed by the following Equations 4 and 5:

$$x = sx + (w/\alpha) \cdot a \qquad \text{Eq. 4}$$

$$y = sy + (h/\beta) \cdot b \qquad \text{Eq. 5}$$

The quantizing section 112 can calculate the bit values a and b from the positional information x and y as shown in Equations 4 and 5. That is, the quantizing section 112 can represent the positional information x and y by quantizing and by using the bit values a and b (the second discrete value).

Thus, the quantizing section 112 represents the positional information of the base station information of the base station 30 located in the base station crowded coverage 42 by the second discrete value and correlates it with the base station ID and records it in the storage section 116.

The quantizing section 112 also represents the positional information of the base station information of the base station 30 located in the normal coverage 40 by the first discrete value (bit values c and d) and correlates it with the base station ID and records it in the storage section 116 in the same manner. The first discrete value is converted into longitude and latitude based on the base point of the normal coverage 40 and longitudinal and latitudinal quantization numbers of the normal coverage 40. Thus, the storage section 116 has a function as a storage medium or a first storage section for storing the base station information in which the quantized positional information is correlated with the base station IDs.

Next, precision of the first discrete value and the second discrete value and the first quantization number and the second quantization number will be explained.

Practically, 0.5 to 4 m of quantization error (positional error) of the first discrete value and the second discrete value may not matter in view of accuracy of the base station information input to the base station information input section 108. Here, although the quantization error may be an interval between positions represented by the respective bit values (bit values a through d) or a half of the interval of the positions represented by the respective bit values, this will be explained as the interval between the positions represented by the respective bit values in the following.

When each of the longitudinal distance w and the latitudinal distance h of the base station crowded coverage 42 shown in FIG. 6 is 65 km, the quantization error is 0.991 m when the base station crowded coverage 42 is longitudinally and latitudinally quantized respectively by the second quantization number of 2 bytes. The quantization error is about 0.1 m when, in the same manner, the normal coverage 40 is quantized by the first quantization number of 3 bytes which is larger than the second quantization number.

Accordingly, the quantizing section 112 may represent the position of the base station 30 located in the base station crowded coverage 42 by using any of the bit values obtained by longitudinally and latitudinally quantizing the base station crowded coverage 42 respectively by the second quantization number of 2 bytes. Moreover, the quantizing section 112 may represent the position of the base station 30 located in the normal coverage 40 by using any of the bit values obtained by longitudinally and latitudinally quantizing the normal coverage 40 respectively by the first quantization number of 3 bytes. One example of base station information recorded in the storage section 116 by such quantizing section 112 will be explained with reference to FIGS. 8A and 8B.

FIG. 8A is an explanatory diagram showing the example of base station information of the base stations 30 located in the base station crowded coverage 42 recorded in the storage section 116. FIG. 8B is an explanatory diagram showing the example of base station information of the base stations 30 located in the normal coverage 40 recorded in the storage section 116.

As shown in FIG. 8A, the base station information of the base stations 30 located in the base station crowded coverage 42 includes the base station IDs of 6 bytes, the bit values a of 2 bytes and the bit values b of 2 bytes. Meanwhile, as shown in FIG. 8B, the base station information of the base stations 30 located in the normal coverage 40 includes the base station IDs of 6 bytes, the bit values c of 3 bytes and the bit values d of 3 bytes.

Here, because the base stations 30 exist more densely in the base station crowded coverage 42 than the normal coverage 40, the total amount of the positional information contained in the base station information stored in the storage section 116 is suppressed. For instance, there is assumed a case where a half million base stations 30 are installed in the normal coverage 40, a half million base stations 30 are installed in the base station crowded coverage 42, and the storage section 116 stores the base station information of all the base stations 30. In this case, the total amount of positional information contained in the base station information is 5 Mbytes from the following Equation 6:

$$\begin{aligned} &\text{Number of base stations located in normal coverage} \cdot 6 + \\ &\quad \text{number of base stations located in} \\ &\quad \text{base station crowded coverage} \cdot 4 = \\ &\quad 500{,}000 \cdot 6 \text{ (byte)} + 500{,}000 \cdot 4 \text{ (byte)} = \\ &\quad 5{,}000{,}000 \text{ (byte)} = 5 \text{ Mbytes} \end{aligned} \qquad \text{Eq. 6}$$

Meanwhile, when the positional information of all the base stations 30 are represented by double floating-points, the total amount of the positional information contained in the base station information is 16 Mbytes from the following Equation 7:

$$\begin{aligned} \text{Total number of base stations} \cdot 16 &= 1{,}000{,}000 \cdot 16 \text{ (byte)} \qquad \text{Eq. 7} \\ &= 16{,}000{,}000 \text{ (byte)} \\ &= 16 \text{ Mbytes} \end{aligned}$$

Accordingly, the total amount of the positional information contained in the base station information may be suppressed to about 31.25% by the quantizing section 112 quantizing and representing the positional information of the base stations 30 as well as implementing different quantization depending on whether the base stations 30 are located in the base station crowded coverage 42 or the normal coverage 40.

The base station information obtaining section 236 of the radio communication apparatus 20 obtains, from the information server 10, the base station information (including information concerning the base point and quantization numbers) whose information amount is suppressed by the quantization described above, and records them in the storage section 232. That is, the storage section 232 stores the base station information of the base stations 30 within the normal coverage 40 whose positional information is represented by using the bit values obtained by quantizing the positions by setting the normal coverage 40 as the quantization coverage and the first quantization number as the quantization number as shown in FIG. 8B. The storage section 232 also stores the base station information of the base stations 30 within the base station crowded coverage 42 whose positional information is represented by using the bit values obtained by quantizing the positions by setting the base station crowded coverage 42 as the quantization coverage and the second quantization number that is smaller than the first quantization number as the quantization number as shown in FIG. 8A.

The position estimating section 224 can extract, from the storage section 232, the positional information of the base station 30 that is the source of the signals received by the communication section 216 represented by the bit values, and can find the longitude and latitude of the base station 30 according to Equations 4 and 5 to use them for estimating the position. For instance, when the position estimating section 224 judges that the base station 30 is located in the base station crowded coverage 42 based on the bit numbers of the positional information of the base station 30 that is the source of the signals received by the communication section 216, it can find the longitude and latitude of the base station 30 by applying Equations 4 and 5. In contrast, when the position estimating section 224 judges that the base station 30 is located in the normal coverage 40, it can find the longitude and latitude of the base station 30 by applying Equations corresponding to Equations 4 and 5.

In addition, because the perimeter of the earth at the equator is 40,000 km, a quantization error is 2.384 m when the longitude is quantized by 3 bytes (a quantization number of third power of 256), i.e., $40,000,000/256^3=2.384$. In the same manner, a quantization error is latitudinally 1.19 m from $20,000,000/256^3=1.19$.

Accordingly, the quantizing section 112 of the information server 10 may simply represent an arbitrary position on the earth by using discrete value obtained by quantizing latitudinally and longitudinally respectively by 3 bytes. According to this method, when a half million base stations 30 are installed in the normal coverage 40 and a half million base stations 30 are installed in the base station crowded coverage 42 similarly to the case described above, the total amount of positional information contained in the base station information is 6 Mbytes from the following Equation 8. Therefore, it is effective to simply represent an arbitrary position on the earth by using the discrete value obtained by quantizing latitudinally and longitudinally respectively by 3 bytes from an aspect of reducing the information amount of the base station information.

$$\text{Total number of base stations} \cdot 6 = 1,000,000 \cdot 6 \text{ (byte)} \quad \text{Eq. 8}$$
$$= 6,000,000 \text{ (byte)}$$
$$= 6 \text{ Mbytes}$$

The position estimating section 224 of the radio communication apparatus 20 can estimate the position more accurately when it receives signals from more base stations 30. Accordingly, the quantization error in the base station crowded coverage 42 may be larger than that in the normal coverage 40 in order to realize the estimation of position in the base station crowded coverage 42 and the estimation of position in the normal coverage 40 made by the position estimating section 224 at the same degree of precision.

Then, the quantizing section 112 of the information server 10 may quantize so that the quantization error in the base station crowded coverage 42 becomes larger than the quantization error in the normal coverage 40. Such configuration allows bit numbers representing position of the base station located in the base station crowded coverage 42 to be suppressed while keeping the precision of the estimation of position performed by the position estimating section 224.

[2-3] Operations of Radio Communication Apparatus and Information Server

The configurations of the radio communication apparatus 20 and the information server 10 have been explained above with reference to FIGS. 2 through 8. Next, the position estimating method executed in the radio communication apparatus 20 and the information server 10 will be explained with reference to FIG. 9.

FIG. 9 is a sequence diagram showing a flow of the position estimating method executed in the radio communication apparatus 20 and the information server 10. First, base station information is input to the base station information input section 108 of the information server 10 (S304). Then, the quantizing section 112 judges whether position indicated by positional information contained in the base station information is contained in the base station crowded coverage 42 or the normal coverage 40 and quantizes the positional information by a method corresponding to a result of the judgment (S308).

Then, the quantizing section 112 records the base station information containing the quantized positional information in the storage section 116 (S312). Subsequently, when the base station information obtaining section 236 of the radio communication apparatus 20 requests the base station information to the information server 10 (S316), the information server 10 transmits the base station information recorded in the storage section 116 to the radio communication apparatus 20 (S320).

In addition, the transmission of the base station information from the information server 10 to the radio communication apparatus 20 may be periodically carried out. Moreover, when the radio communication apparatus 20 has the base station information already stored, the information server 10 may transmit only an updated portion of the base station information to the radio communication apparatus 20.

On obtaining the base station information from the information server 10, the base station information obtaining section 236 records the obtained base station information in the storage section 232 (S324). When the communication section 216 receives signals from surrounding base stations 30 after that (S328), the position estimating section 224 estimates the position of the radio communication apparatus 20 based on the received signals and the base station information stored in the storage section 232 (S332).

For instance, the position estimating section 224 extracts positional information correlated with the base station ID contained in each received signals from among positional information quantized and contained in the base station information stored in the storage section 232. Then, the position estimating section 224 can decode the extracted and quantized positional information into latitude and longitude and estimate the position of the radio communication apparatus 20 by performing the arithmetic operation shown in Equation 1 by using the decoded latitude and longitude.

After that, the application section 228 can perform processes of informing the user of the position estimated by the position estimating section 224, requesting the user for authentication processing corresponding to the position estimated by the position estimating section 224, and the like.

[3] Conclusion

As described above, the storage section 232 of the radio communication apparatus 20 according to the present embodiment stores the base station information of the base stations 30 within the normal coverage 40 whose positional information is represented by bit values (first discrete value) obtained by quantizing the positions by setting the normal coverage 40 as the quantization coverage and the first quantization number as the quantization number. The storage section 232 also stores the base station information of the base stations 30 within the base station crowded coverage 42 whose positional information is represented by using bit values (second discrete value) obtained by quantizing the positions by setting the base station crowded coverage 42 as the quantization coverage and the second quantization number that is smaller than the first quantization number as the quantization number.

Because the second quantization number is smaller than the first quantization number in the configuration described above, an information amount required for representing the second discrete value may be suppressed more than an information amount required for representing the first discrete value. Here, the density of the base stations located in the base station crowded coverage 42 is higher than the density of the base stations located in the normal coverage 40. Accordingly, the radio communication apparatus 20 can keep the positional information of the base stations 30 located in the normal coverage 40 and in the base station crowded coverage 42 while suppressing their information amount as compared to a case of simply quantizing the normal coverage 40 and the base station crowded coverage 42 altogether.

In addition, although a preferred embodiment of the present invention has been described with reference to the accompanying drawings, the present invention is not limited thereto as a matter of course. It is obvious to those skilled in the art that various alternations and modifications may be made without departing from the scope of the claims and thus are intended for inclusion within the technical scope of the present invention.

For example, although the case of distinctively storing only the base station information contained in one normal coverage 40 and the base station information contained in one base station crowded coverage 42 has been explained in the embodiment described above, the present invention is not limited to such example. A modified example will be explained below with reference to FIG. 10.

Figure 10:
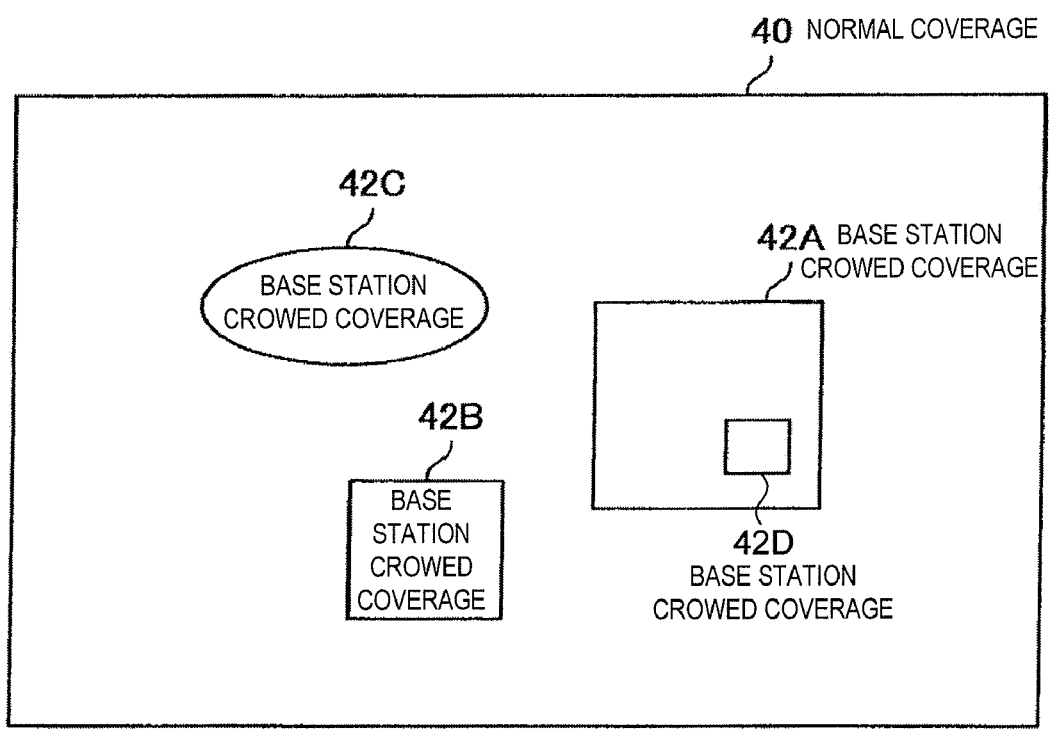
FIG. 10 is an explanatory diagram showing an exemplary modification of the normal coverage and the base station crowded coverage.

FIG. 10 is an explanatory diagram showing the exemplary modification of the normal coverage 40 and the base station crowded coverage 42. As shown in FIG. 10, a plurality of base station crowded coverages 42 such as a base station crowded coverage 42A and a base station crowded coverage 42B may be contained in one normal coverage. Moreover, the base station crowded coverage 42 is not limited to be rectangular and may have an arbitrary shape such as an elliptical shape as shown in a base station crowded coverage 42C or a triangular shape. Moreover, a relationship of quantization numbers applied to the base station crowded coverage 42A, 42B and 42C is not specifically limited.

Furthermore, there may be a base station crowded coverage 42 like a base station crowded coverage 42D that is set within the base station crowded coverage 42A. In this case, quantization numbers applied to the base station crowded coverage 42D are smaller than quantization numbers applied to the base station crowded coverage 42A, and from a point of view of the base station crowded coverage 42D, the base station crowded coverage 42A may correspond to the normal coverage 40.

Moreover, although the case where the quantizing section 112 quantizes the positional information into bit values corresponding to the longitudinal and latitudinal directions has been explained above, the present invention is not limited to such case. For instance, the quantizing section 112 may quantize the positional information into a bit value in which a solution of an divided integer corresponds to the longitudinal direction and into a bit value in which the remainder corresponds to the latitudinal direction. The quantizing section 112 may also quantize the positional information on a polar coordinate plane. Furthermore, the quantization method for the normal coverage 40 may be different from the quantization method for the base station crowded coverage 42.

The quantizing section 112 may also quantize the positional information into bit values corresponding to a size of a center angle of a sinusoidal wave having arbitrary amplitude and frequency.

The respective steps in the process of the radio communication apparatus 20 and the information server 10 of the present specification are not always necessary to be processed in chronological order in accordance with the order described in the sequence diagram and may include processes executed in parallel or individually (e.g., a parallel processing or process by objects).

It is also possible to create a computer program for making the hardware such as the CPU 201, the ROM 202 and the RAM 203 built in the radio communication apparatus 20 and the information server 10 exhibit equivalent functions with the respective configurations of the radio communication apparatus 20 and the information server 10 described above. Moreover, there may be provided a storage medium storing the computer program. It is also possible to configure the respective functional blocks shown in the functional block diagram of FIG. 3 by hardware, thereby realizing the series of processes by hardware.

What is clamed is:

1. A position estimating system comprising:
a radio communication apparatus capable of wirelessly communicating with one or more base stations; and
an information server capable of communicating with the radio communication apparatus, wherein
the information server includes
a quantizing section for representing positional information of a first base station located in a first coverage by using a first discrete value obtained by quantizing a position of the first base station by setting the first coverage as a quantization coverage and a first quantization number as a quantization number, and
for representing positional information of a second base station located in a second coverage, whose area is narrower than the first coverage and where base stations are more densely installed than base stations in the first coverage, by using a second discrete value obtained by quantizing a position of the second base station by setting the second coverage as a quantization coverage and a second quantization number that is smaller than the first quantization number as a quantization number,
a first storage section for storing base station information in which the positional information represented by using the first discrete value or the second discrete value is correlated with identification information of the first or second base station respectively, and
a transmitting section for transmitting the base station information to the radio communication apparatus, and wherein
the radio communication apparatus includes
an obtaining section for obtaining the base station information that is transmitted from the transmitted section and stored in the first storage section,
a second storage section for storing the base station information obtained by the obtaining section,
a receiving section for receiving radio signals containing the identification information of the first or second base station transmitted from the first or second base station, and
a position estimating section for extracting the positional information of the first or second base station indicated by the identification information contained in the radio signals from the positional information stored in the storage section and estimating a position of the radio communication apparatus based on the extracted positional information.

2. A radio communication apparatus capable of wirelessly communicating with one or more base stations, comprising:
- a storage section for correlating and storing positional information and identification information of the one or more base stations;
- a receiving section for receiving radio signals transmitted from the one or more base stations and containing the identification information of the one or more base stations; and
- a position estimating section for extracting the positional information of the one or more base stations indicated by the identification information contained in the radio signals from the positional information stored in the storage section and estimating a position of the radio communication apparatus based on the extracted positional information, wherein
  in the storage section,
  positional information of a first base station located in a first coverage is represented by using a first discrete value obtained by quantizing a position of the first base station by setting the first coverage as a quantization coverage and a first quantization number as a quantization number, and
  positional information of a second base station located in a second coverage whose area is narrower than the first coverage and where base stations are more densely installed than base stations in the first coverage is represented by using a second discrete value obtained by quantizing a position of the second base station by setting the second coverage as a quantization coverage and a second quantization number that is smaller than the first quantization number as a quantization number.

3. The radio communication apparatus according to claim 2, wherein the first quantization number or the second quantization number is a value that keeps a quantization error of the first discrete value or the second discrete value within a range of 0.5 m to 4 m.

4. The radio communication apparatus according to claim 3, wherein the first coverage is a coverage excluding the second coverage from a predetermined coverage overlapping with the second coverage.

5. The radio communication apparatus according to claim 4, wherein a plurality of second coverages are contained in the predetermined coverage.

6. The radio communication apparatus according to claim 3, wherein the quantization error of the second discrete value is larger than the quantization error of the first discrete value.

7. A program for operating a computer as a radio communication apparatus capable of wirelessly communicating with one or more base stations, comprising:
- a receiving section for receiving radio signals transmitted from the one or more base stations and containing identification information for identifying the one or more base stations; and
- a position estimating section for extracting positional information of the one or more base stations indicated by the identification information contained in the radio signals from a storage medium that correlates and stores the identification information and the positional information indicating the position of the one or more base stations, and estimating a position of the radio communication apparatus based on the extracted positional information, wherein
  in the storage medium,
  positional information of a first base station located in a first coverage is represented by using a first discrete value obtained by quantizing a position of the first base station by setting the first coverage as a quantization coverage and a first quantization number as a quantization number, and
  positional information of a second base station located in a second coverage, whose area is narrower than the first coverage and where base stations are more densely installed than base stations in the first coverage, is represented by using a second discrete value obtained by quantizing a position of the second base station by setting the second coverage as a quantization coverage and a second quantization number that is smaller than the first quantization number as a quantization number.

8. A position estimating method executed in a radio communication apparatus capable of wirelessly communicating with one or more base stations, comprising the steps of:
- receiving radio signals transmitted from the one or more base stations and containing identification information for identifying the one or more base stations; and
- extracting positional information of the one or more base stations indicated by the identification information contained in the radio signals from a storage medium that correlates and stores the identification information and the positional information indicating the existing position of the one or more base stations, and estimating a position of the radio communication apparatus based on the extracted positional information, wherein in the storage medium,
  positional information of a first base station located in a first coverage is represented by using a first discrete value obtained by quantizing a position of the first base station by setting the first coverage as a quantization coverage and a first quantization number as a quantization number, and
  positional information of a second base station located in a second coverage, whose area is narrower than the first coverage and where base stations are more densely installed than base stations in the first coverage, is represented by using a second discrete value obtained by quantizing a position of the second base station by setting the second coverage as a quantization coverage and a second quantization number that is smaller than the first quantization number as a quantization number.

9. An information server capable of communicating with a radio communication apparatus capable of wirelessly communicating with one or more base stations, comprising:
- a quantizing section for representing positional information of a first base station located in a first coverage by using a first discrete value obtained by quantizing a position of the first base station by setting the first coverage as a quantization coverage and a first quantization number as a quantization number, and
  for representing positional information of a second base station located in a second coverage, whose area is narrower than the first coverage and where base stations are more densely installed than base stations in the first coverage, by using a second discrete value obtained by quantizing a position of the second base station by setting the second coverage as a quantization coverage and a second quantization number that is smaller than the first quantization number as a quantization number;

a storage section for storing base station information in which the positional information represented by using the first discrete value or the second discrete value is correlated with identification information of the first or second base station respectively; and a communication section for transmitting the base station information stored in the storage section to the radio communication apparatus.

* * * * *